US012601387B2

(12) United States Patent
Zhang et al.

(10) Patent No.: US 12,601,387 B2
(45) Date of Patent: Apr. 14, 2026

(54) SHOCK-ABSORBING STRUCTURE AND HOLDER

(71) Applicant: Xuanming Deng, Shenzhen (CN)

(72) Inventors: Bo Zhang, Shenzhen (CN); Weihui Zhang, Shenzhen (CN); Lianzeng Li, Shenzhen (CN)

(73) Assignee: Xuanming Deng, Shenzhen (CN)

( * ) Notice: Subject to any disclaimer, the term of this patent is extended or adjusted under 35 U.S.C. 154(b) by 26 days.

(21) Appl. No.: 18/755,091

(22) Filed: Jun. 26, 2024

(65) Prior Publication Data

US 2026/0002576 A1     Jan. 1, 2026

(51) Int. Cl.
| | |
|---|---|
| *F16F 15/08* | (2006.01) |
| *B60R 11/02* | (2006.01) |
| *B62J 11/00* | (2020.01) |
| *F16F 3/10* | (2006.01) |

(52) U.S. Cl.
CPC ............ *F16F 15/085* (2013.01); *B60R 11/02* (2013.01); *B62J 11/00* (2013.01); *F16F 3/10* (2013.01)

(58) Field of Classification Search
CPC . F16F 15/085; F16F 3/10; B60R 11/02; B62J 11/00; F16M 11/14; G03B 17/561
USPC .......................... 248/573, 603, 610–611, 613
See application file for complete search history.

(56) References Cited

U.S. PATENT DOCUMENTS

| | | | | | | |
|---|---|---|---|---|---|---|
| 1,383,386 | A | * | 7/1921 | Buchanan | ............ | B60Q 1/0483 |
| | | | | | | 248/602 |
| 1,880,181 | A | * | 9/1932 | Turner | ................... | B60N 2/522 |
| | | | | | | 248/599 |

| | | | | | | |
|---|---|---|---|---|---|---|
| 5,641,153 | A | * | 6/1997 | Gwinn | ............... | B62D 33/0604 |
| | | | | | | 267/141.1 |
| D758,951 | S | | 6/2016 | Unterlechner | | |
| D787,422 | S | | 5/2017 | Unterlechner | | |
| D960,143 | S | | 8/2022 | Wu | | |

(Continued)

FOREIGN PATENT DOCUMENTS

| | | |
|---|---|---|
| CN | 303579364 S | 2/2016 |
| CN | 214888612 U | 11/2021 |
| JP | 1727336 S | 10/2022 |

OTHER PUBLICATIONS

U.S. Appl. No. 29/950,569 mailed Nov. 25, 2025. 6 pages.

(Continued)

*Primary Examiner* — Christopher Garft
(74) *Attorney, Agent, or Firm* — Brooks Kushman P.C.

(57) ABSTRACT

A shock-absorbing structure including a first connection member, a second connection member, and a buffer assembly arranged on the first connection member and the second connection member; the buffer assembly includes a connection column, a first elastic member, and a second elastic member; the first connection member and the second connection member are arranged at intervals, the connection column is arranged on the first connection member and penetrates through the second connection member, and an end of the connection column is provided with a limiting member; two ends of the first elastic member are respectively abutted against the first connection member and the second connection member, two ends of the second elastic member are respectively abutted against the second connection member and the limiting member, and the first elastic member and the second elastic member are sleeved on the connection column.

8 Claims, 3 Drawing Sheets

10

(56) References Cited

U.S. PATENT DOCUMENTS

| | | | |
|---|---|---|---|
| D976,892 S | 1/2023 | Luo | |
| D986,878 S | 5/2023 | Zhou | |
| D986,879 S | 5/2023 | Zhou | |
| D1,003,292 S | 10/2023 | Zhou | |
| D1,018,519 S | 3/2024 | Zou | |
| D1,030,733 S | 6/2024 | Tang | |
| D1,041,464 S | 9/2024 | Zeng | |
| 2012/0199620 A1* | 8/2012 | Gold | B62J 11/00 |
| | | | 224/413 |
| 2012/0248166 A1* | 10/2012 | Gold | F16M 13/022 |
| | | | 248/636 |
| 2019/0127084 A1* | 5/2019 | Yau | G03B 15/006 |
| 2021/0295813 A1* | 9/2021 | Gernhart | G10K 11/16 |
| 2023/0182151 A1* | 6/2023 | Fiedler | F16F 15/06 |
| | | | 494/82 |
| 2024/0218955 A1 | 7/2024 | Deng | |

OTHER PUBLICATIONS

Japan Patent Office Design Registration Assessment 2024-012330 mailed Jan. 21, 2025. 4 pages.

Li, Wensong. "Mobile phone holder" (Chinese Design Patent No. 201530370400.7). TMDNC / Clarivate DesignVision. 2015. 10 pages.

"Lamicall Motorcycle Phone Mount Holder [Dual Vibration Dampener]." Amazon, Lamicall, 2025, www.amazon.com. 12 pages.

* cited by examiner

10

10

100

110

10

SHOCK-ABSORBING STRUCTURE AND HOLDER

TECHNICAL FIELD

The present application relates to the field of holders, and more specifically to a shock-absorbing structure and a holder.

BACKGROUND

Recently, electronic devices have entered every aspect of lives of people. In order to facilitate the use of the electronic devices, people often use portable mobile phone holders to support mobile phones and other electronic devices. The function of mobile phone holders is to provide the function of placing mobile phones. One type of the holders is stationary type, such as the mobile phone holders, etc. placed on the desk, and the other type of the holders is dynamic type, such as holders used in cars, motorcycles, bicycles, electric bicycles and other transportation vehicles and other dynamic application scenarios. However, vehicles have vibrations and bumps during driving, especially motorcycles, bicycles, electric bicycles and other transportation vehicles with large vibrations and bumps. With the continuous development of mobile phone technology, it has become more and more precise, especially the mobile phone cameras using multi lens structure has increasingly high seismic performance requirements. However, there is currently no truly meaningful mobile phone holder with shock-absorbing function on the market. Additionally, vibration and bumps can cause the phone to detach from the mobile phone holder.

Due to the lack or poor shock-absorbing function of mobile phone holders on the market, users may experience damage to their phone cameras or other internal components when using the mobile phones in high vibration environments such as motorcycles, bicycles, and electric bicycles. In addition, the lack of shock-absorbing function in mobile phone holders can cause the mobile phone to detach from the holder during continuous vibration or large bumps, resulting in unnecessary economic losses for users. Therefore, there is a need for a structure that can solve the shock-absorbing function of the holder to improve the stability of the shock-absorbing effect.

SUMMARY

The present application provides a shock-absorbing structure and a holder, which has the advantages of good shock-absorbing performance and can avoid excessive vibration during vehicle driving that nay easily damage the mobile terminal. The present application solves the problem of excessive vibration during vehicle driving that may easily damage the mobile terminal.

According to the shock-absorbing structure provided by an embodiment of the present application, the shock-absorbing structure includes a first connection member, a second connection member, and a buffer assembly arranged on the first connection member and the second connection member; the buffer assembly includes a connection column, a first elastic member, and a second elastic member; the first connection member and the second connection member are arranged at intervals, the connection column is arranged on the first connection member and penetrates through the second connection member, and an end of the connection column is provided with a limiting member; two ends of the first elastic member are respectively abutted against the first connection member and the second connection member, two ends of the second elastic member are respectively abutted against the second connection member and the limiting member, and the first elastic member and the second elastic member are sleeved on the connection column.

Optionally, four buffer assemblies are provided, and the four buffer assemblies are distributed in an array on the first connection member and the second connection member.

Optionally, the four buffer assemblies are distributed in a circular array or a rectangular array on the first connection member and the second connection member.

Optionally, the first elastic member is a conical spring, the second elastic member is a silicone member, or the first elastic member is a silicone member, and the second elastic member is a conical spring.

Optionally, the limiting member comprises a fixing member and an accommodating member, the fixing member is connected to the accommodating member, the fixing member is arranged on the second elastic member and corresponds to the second elastic member, the second connection member is provided with a ball head member, and the ball head member penetrates through the accommodating member.

Optionally, an end with a larger diameter of the conical spring is abutted against the second connection member, and an end with a smaller diameter of the conical spring is abutted against the first connection member; an end with a larger diameter of the silicone member is abutted against the second connection member, and an end with a smaller diameter of the silicone member is abutted against the limiting member.

In order to solve above technical problem, the present application provides a holder, and the holder includes the shock-absorbing structure mentioned above; the first connection member is connected to an electronic device clamping end, and the second connection member is connected to an universal ball structure.

The technical solution provided in the embodiments of the present application may include the following beneficial effects:

In the present application, the connection column is arranged on the first connection member, the connection column is penetrated through the second connection member; and an end of the connection column is provided with the limiting member, two ends of the first elastic member are respectively abutted against the first connection member and the second connection member, and two ends of the second elastic member are respectively abutted against the second connection member and the limiting member. When external vibrations occur, such as when starting a motorcycle or driving a non motorized vehicle to a bumpy road section, the vibration is a longitudinal high-frequency vibration. The vibration is transmitted from the second connection member to the first connection member, and the second connection member repeatedly moves on the first connection member and the limiting member. When the second connection member moves towards the first connection member, the first elastic member is elastically compressed and generates rebound force on the second connection member. When the second connection member moves towards the first connection member, the second clastic member is elastically compressed and generates rebound force on the second connection member, which results in a significant reduction in high-frequency vibration transmitted from the second connection member to the first connection member. The shock-absorbing structure provided by the present application has excellent shock-absorbing performance. By buffering the vibration between the first connection member and the second connection member, which can buffer the damage caused by high-frequency vibrations such as motorcycles or bumpy road sections, effectively alleviate terminal damage caused by vehicle vibrations, and ensure the service life of mobile phones or other mobile terminals.

The four buffer assemblies are provided, and the four buffer assemblies are distributed in an array on the first connection member and the second connection member. The four buffer assemblies are distributed in a circular array or a rectangular array on the first connection member and the second connection member. The four buffer assemblies are distributed in an array on the first connection member and the second connection member, which can achieve a balanced buffering effect on the vibration force. The vibration force transmitted by the first connection member is evenly distributed on the second connection member through the buffer assemblies of the array, and the damping effect is increased.

The first elastic member is a conical spring, the second elastic member is a silicone member, or the first elastic member is a silicone member, and the second clastic member is a conical spring. The symmetrical dual shock absorption system of spring and silicone is used, the elastic shock absorption characteristics of spring and silicone member increases the buffering and shock-absorbing effect.

The design uses the limiting member, which further restricts the elastic movement of the second elastic member, and avoids displacement of the second elastic member due to vibration, and effectively fixes the second elastic member.

An end with a larger diameter of the conical spring is abutted against the second connection member, and an end with a smaller diameter of the conical spring is abutted against the first connection member; an end with a larger diameter of the silicone member is abutted against the second connection member, and an end with a smaller diameter of the silicone member is abutted against the limiting member. Using this design, the end with a larger diameter of the conical spring is arranged on the second connection member, and the end with a smaller diameter of the conical spring is arranged on the first connection member. The vibration received on the first connection member is transmitted from the end with a smaller diameter of the conical spring to the end with a larger diameter, and the vibration effect gradually decreases in the transmission path, the transmission of vibration is effectively reduced. At the same time, the end with a larger diameter of silicone member is abutted against the second connection member, and the end with a smaller diameter of silicone member is abutted against the limiting member. The symmetrical design of silicone member and conical spring further improves the buffering effect of vibration.

BRIEF DESCRIPTION OF THE DRAWINGS

In order to explain the embodiments of the present application more clearly, a brief introduction regarding the accompanying drawings that need to be used for describing the embodiments of the present application or the prior art is given below; it is obvious that the accompanying drawings described as follows are only some embodiments of the present application, for those skilled in the art, other drawings can also be obtained according to the current drawings on the premise of paying no creative labor.

Figure 1:
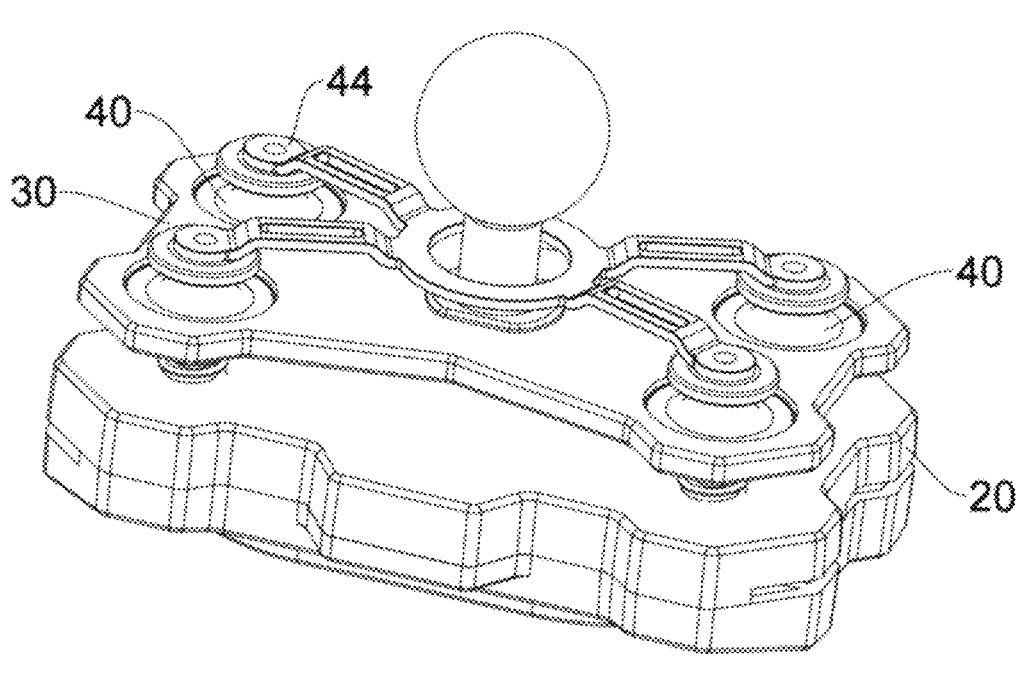
FIG. 1 is a schematic view of a perspective structure of a shock-absorbing structure of the present application.

In the Drawings, the reference signs are listed:

10—shock-absorbing structure; 20—first connection member; 30—second connection member; 31—ball head member; 40—buffer assembly; 41—connection column; 42—first elastic member; 43—second elastic member; 44—limiting member; 45—fixing member; 46—accommodating member; 100—holder; 110—electronic device clamping end.

DETAILED DESCRIPTION OF EMBODIMENTS

Herein, embodiments of the present application are described in detail, and examples of the embodiment are illustrated in the accompanying figures; an always unchanged reference number or similar reference numbers represent(s) identical or similar components or components having identical or similar functionalities. The embodiment described below with reference to the accompanying figures is illustrative and intended to illustrate the present application, but should not be considered as any limitation to the present application.

It should also be understood that the terms used in the specification of the present application are only for the purpose of describing specific embodiments and are not intended to limit the present application. As used in the specification and the accompanying claims of the present application, unless the context clearly indicates other circumstances, singular forms of "a", "an", and "the" are intended to include plural forms.

It should be further understood that the terms "and/or" used in the specification and the accompanying claims of the present application refer to any combination of one or more of the items listed in association and all possible combinations, and include these combinations.

Figure 2:
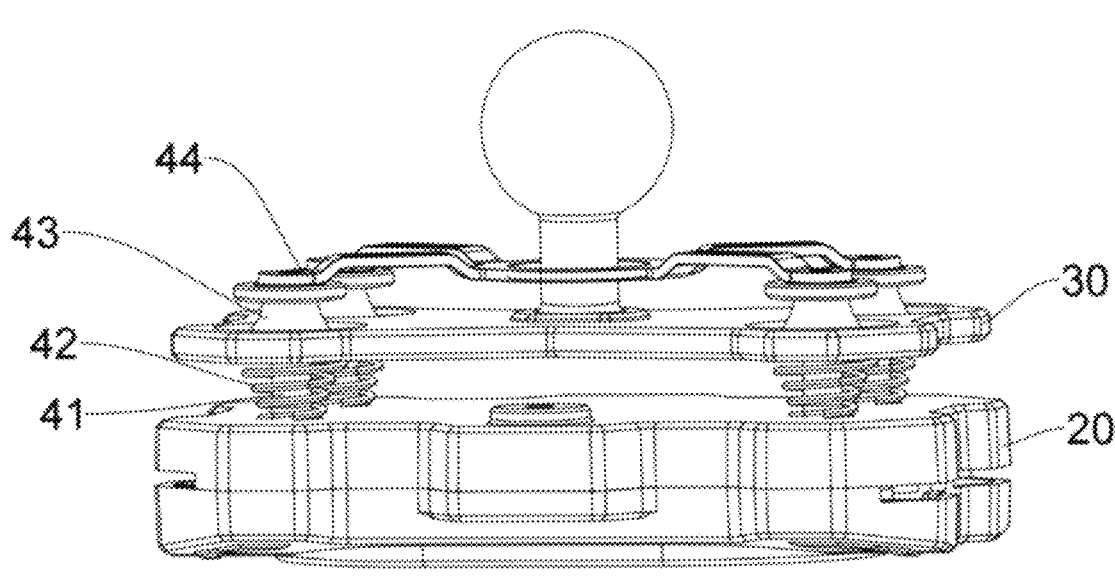
FIG. 2 is a schematic view of another perspective structure of a shock-absorbing structure of the present application.

As shown in FIGS. 1 and 2. The present application provides a shock-absorbing structure 10, which includes a first connection member 20, a second connection member 30, and a buffer assembly 40. The first connection member 20 and the second connection member 30 are arranged at intervals, and the buffer assembly 40 is provided on the first connection member 20 and the second connection member 30. The buffer assembly 40 includes a connection column 41, a first elastic member 42, and a second elastic member 43. The connection column 41 is provided on the first connection member 20, and the connection column 41 is penetrated through the second connection member 30. A limiting member 44 is provided on one end of the connection column 41, and the two ends of the first elastic member 42 respectively abut against the first connection member 20 and second connection member 30, the two ends of the second elastic member 43 respectively abut against the second connection member 30 and the limiting member 44, and the first elastic member 42 and the second elastic member 43 are sleeved on the connection column 41.

In the embodiment, the first connection member 20 and the second connection member 30 are sheet structures. Optionally, in some other embodiments, the first connection member 20 and the second connection member 30 are other structures such as other sheets.

As shown in FIG. 2, four buffer assemblies 40 are provided, and the four buffer assemblies 40 are distributed in an array on the first connection member 20 and the second connection member 30. In the embodiment, the four buffer assemblies 40 are distributed in a circular array or a rectangular array on the first connection member 20 and the second connection member 30. As the optimal embodiment, four buffer assemblies 40 are provided, and the four buffer assemblies 40 are arranged in a rectangular array on the first connection member 20 and the second connection member 30.

Figure 3:
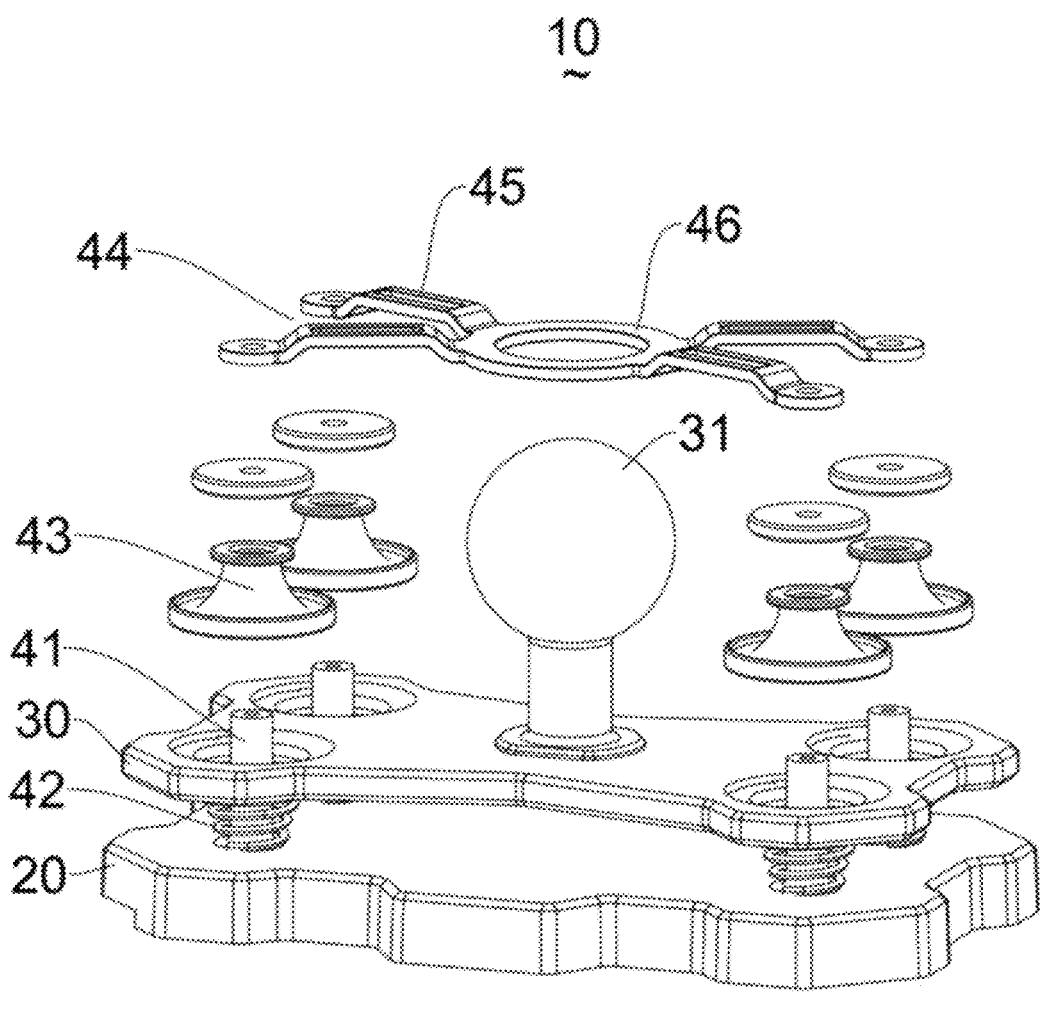
FIG. 3 is a schematic view of an explosive structure of a shock-absorbing structure of the present application.

As shown FIG. 3, the first elastic member 42 is a conical spring, the second elastic member 43 is a silicone member, or the first elastic member 42 is a silicone member, and the second elastic member 43 is a conical spring. In the embodiment, the first elastic member 42 is a conical spring, the second elastic member 43 is a silicone member, and the end with a larger diameter of the conical spring is abutted against the second connection member 30, while the end with a smaller diameter of the conical spring is abutted against the first connection member 20. The silicone member is a conical silicone member, the end with the larger diameter of the silicone member is abutted against the second connection member 30, and the end of with a smaller diameter of the silicone member is abutted against the limiting member 44.

The limiting member 44 includes a fixing member 45 and an accommodating member 46, and the fixing member 45 is connected to the accommodating member 46, and the fixing member 45 is arranged on the second elastic member 43 and corresponds to the second elastic member 43. The second connection member 30 is provided with a ball head member 31, which is penetrated through the accommodating member 46. Preferably, in the embodiment, four fixing members 45 and four second elastic members 43 are provided, and one end of each of the four fixing members 45 is respectively connected to the four second elastic members 43, and the other end of each of the four fixing members 45 is connected to the fixing member 45, the accommodating member 46 is a circular structure, and the ball head member 31 penetrates the center of the accommodating member 46.

Figure 4:
FIG. 4 is a structural schematic view of a holder of the present application.
Figure 4:
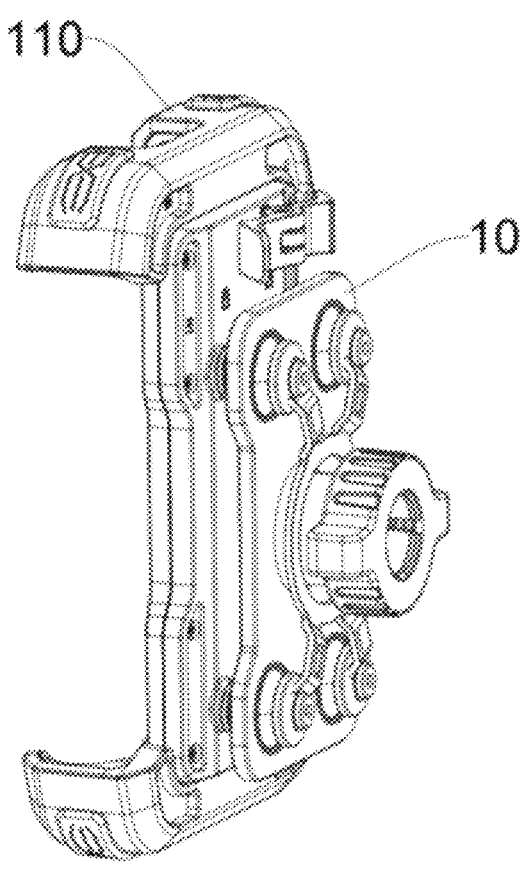

As shown in FIG. 4, the second embodiment of the present application provides a holder 100, the holder 100 includes a shock-absorbing structure 10 as described above. The first connection member 20 is connected to the electronic device clamping end 110, and the second connection member 30 is connected to the universal ball structure.

The technical solution provided in the embodiments of the present application may include the following beneficial effects:

In the present application, the connection column is arranged on the first connection member, the connection column is penetrated through the second connection member; and an end of the connection column is provided with the limiting member, two ends of the first elastic member are respectively abutted against the first connection member and the second connection member, and two ends of the second elastic member are respectively abutted against the second connection member and the limiting member. When external vibrations occur, such as when starting a motorcycle or driving a non motorized vehicle to a bumpy road section, the vibration is a longitudinal high-frequency vibration. The vibration is transmitted from the second connection member to the first connection member, and the second connection member repeatedly moves on the first connection member and the limiting member. When the second connection member moves towards the first connection member, the first elastic member is elastically compressed and generates rebound force on the second connection member. When the second connection member moves towards the first connection member, the second elastic member is elastically compressed and generates rebound force on the second connection member, which results in a significant reduction in high-frequency vibration transmitted from the second connection member to the first connection member. The shock-absorbing structure provided by the present application has excellent shock-absorbing performance. By buffering the vibration between the first connection member and the second connection member, which can buffer the damage caused by high-frequency vibrations such as motorcycles or bumpy road sections, effectively alleviate terminal damage caused by vehicle vibrations, and ensure the service life of mobile phones or other mobile terminals.

The four buffer assemblies are provided, and the four buffer assemblies are distributed in an array on the first connection member and the second connection member. The four buffer assemblies are distributed in a circular array or a rectangular array on the first connection member and the second connection member. The four buffer assemblies are distributed in an array on the first connection member and the second connection member, which can achieve a balanced buffering effect on the vibration force. The vibration force transmitted by the first connection member is evenly distributed on the second connection member through the buffer assemblies of the array, and the damping effect is increased.

The first elastic member is a conical spring, the second elastic member is a silicone member, or the first elastic member is a silicone member, and the second elastic member is a conical spring. The symmetrical dual shock absorption system of spring and silicone is used, the elastic shock absorption characteristics of spring and silicone member increases the buffering and shock-absorbing effect.

The design uses the limiting member, which further restricts the elastic movement of the second elastic member, and avoids displacement of the second elastic member due to vibration, and effectively fixes the second elastic member.

An end with a larger diameter of the conical spring is abutted against the second connection member, and an end with a smaller diameter of the conical spring is abutted against the first connection member; an end with a larger diameter of the silicone member is abutted against the second connection member, and an end with a smaller diameter of the silicone member is abutted against the limiting member. Using this design, the end with a larger diameter of the conical spring is arranged on the second connection member, and the end with a smaller diameter of the conical spring is arranged on the first connection member. The vibration received on the first connection member is transmitted from the end with a smaller diameter of the conical spring to the end with a larger diameter, and the vibration effect gradually decreases in the transmission path, the transmission of vibration is effectively reduced. At the same time, the end with a larger diameter of silicone member is abutted against the second connection member, and the end with a smaller diameter of silicone member is abutted against the limiting member. The symmetrical design of silicone member and conical spring further improves the buffering effect of vibration.

The above is only a specific implementation of the present application, but the scope of protection of the present application is not limited to this. Any technical personnel familiar with the technical field within the scope of the disclosed technology of the present application can easily think of various equivalent modifications or replacements, which should be covered within the scope of protection of the present application. Therefore, the protection scope of the present application should be based on the protection scope of the claims.

What is claimed is:

1. A shock-absorbing structure, comprising:

a first connection member;

a second connection member; and a buffer assembly, arranged on the first connection member and the second connection member, and comprising a connection column, a first elastic member, and a second elastic member;

wherein the first connection member and the second connection member are arranged at intervals, the connection column is arranged on the first connection member and penetrates through the second connection member, and an end of the connection column is provided with a limiting member; two ends of the first elastic member are respectively abutted against the first connection member and the second connection member, two ends of the second elastic member are respectively abutted against the second connection member and the limiting member, and the first elastic member and the second elastic member are sleeved on the connection column;

wherein the first elastic member is a conical spring, the second elastic member is a silicone member, or the first elastic member is a silicone member, and the second elastic member is a conical spring; and wherein the limiting member comprises a fixing member and an accommodating member, the fixing member is connected to the accommodating member, the fixing member is arranged on the second elastic member and corresponds to the second elastic member, the second connection member is provided with a ball head member, and the ball head member penetrates through the accommodating member.

2. The shock-absorbing structure according to claim 1, wherein four buffer assemblies are provided, and the four buffer assemblies are distributed in an array on the first connection member and the second connection member.

3. The shock-absorbing structure according to claim 2, wherein the four buffer assemblies are distributed in a circular array or a rectangular array on the first connection member and the second connection member.

4. The shock-absorbing structure according to claim 1, wherein an end with a larger diameter of the conical spring is abutted against the second connection member, and an end with a smaller diameter of the conical spring is abutted against the first connection member; an end with a larger diameter of the silicone member is abutted against the second connection member, and an end with a smaller diameter of the silicone member is abutted against the limiting member.

5. A holder, comprising a shock-absorbing structure, wherein the shock-absorbing structure includes:

a first connection member;

a second connection member; and a buffer assembly, arranged on the first connection member and the second connection member, and comprising a connection column, a first elastic member, and a second elastic member;

wherein the first connection member and the second connection member are arranged at intervals, the connection column is arranged on the first connection member and penetrates through the second connection member, and an end of the connection column is provided with a limiting member; two ends of the first elastic member are respectively abutted against the first connection member and the second connection member, two ends of the second elastic member are respectively abutted against the second connection member and the limiting member, and the first elastic member and the second elastic member are sleeved on the connection column;

wherein the first elastic member is a conical spring, the second elastic member is a silicone member, or the first elastic member is a silicone member, and the second elastic member is a conical spring;

wherein the limiting member comprises a fixing member and an accommodating member, the fixing member is connected to the accommodating member, the fixing member is arranged on the second elastic member and corresponds to the second elastic member, the second connection member is provided with a ball head member, and the ball head member penetrates through the accommodating member; and wherein the first connection member is connected to an electronic device clamping end, and the second connection member is connected to a universal ball structure.

6. The holder according to claim 5, wherein four buffer assemblies are provided, and the four buffer assemblies are distributed in an array on the first connection member and the second connection member.

7. The holder according to claim 6, wherein the four buffer assemblies are distributed in a circular array or a rectangular array on the first connection member and the second connection member.

8. The holder according to claim 5, wherein an end with a larger diameter of the conical spring is abutted against the second connection member, and an end with a smaller diameter of the conical spring is abutted against the first connection member; an end with a larger diameter of the silicone member is abutted against the second connection member, and an end with a smaller diameter of the silicone member is abutted against the limiting member.

* * * * *